(12) United States Patent
Olsen

(10) Patent No.: US 10,091,119 B2
(45) Date of Patent: Oct. 2, 2018

(54) MANAGING DATA IN A STATIC NETWORK PRIOR TO INITIALIZATION

(71) Applicant: HARMAN INTERNATIONAL INDUSTRIES, INC., Stamford, CT (US)

(72) Inventor: Dave Olsen, Kaysville, UT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 97 days.

(21) Appl. No.: 14/664,252

(22) Filed: Mar. 20, 2015

(65) Prior Publication Data

US 2016/0277302 A1    Sep. 22, 2016

(51) Int. Cl.
| | |
|---|---|
| *H04L 12/28* | (2006.01) |
| *H04L 12/841* | (2013.01) |
| *H04L 12/861* | (2013.01) |
| *H04J 3/06* | (2006.01) |
| *H04N 21/00* | (2011.01) |

(52) U.S. Cl.
CPC .......... *H04L 47/283* (2013.01); *H04J 3/0632* (2013.01); *H04L 49/9005* (2013.01); *H04N 21/00* (2013.01); *H04J 3/0667* (2013.01)

(58) Field of Classification Search
CPC .................................................... H04L 47/283
See application file for complete search history.

(56) References Cited

U.S. PATENT DOCUMENTS

| | | | | |
|---|---|---|---|---|
| 8,937,974 B1* | 1/2015 | Pannell | .................. | G06F 13/385 370/230 |
| 2007/0240018 A1* | 10/2007 | Nalawadi | ............ | G06F 11/1438 714/23 |
| 2008/0141184 A1* | 6/2008 | Dirks | .................. | G06F 17/5031 716/103 |
| 2010/0182909 A1* | 7/2010 | Sagara | .................... | G06F 9/505 370/235 |
| 2013/0003757 A1* | 1/2013 | Boatright | .............. | H04J 3/0697 370/474 |
| 2013/0132560 A1* | 5/2013 | Hudzia | .................. | H04L 47/283 709/224 |
| 2013/0138800 A1* | 5/2013 | Gelter | .............. | H04N 21/64738 709/224 |
| 2014/0226984 A1* | 8/2014 | Roberts | .................. | H04B 10/27 398/66 |
| 2015/0215821 A1* | 7/2015 | Zhang | .................... | H04W 4/028 370/252 |
| 2016/0149784 A1* | 5/2016 | Zhang | .................. | H04B 1/0003 370/229 |

* cited by examiner

*Primary Examiner* — Chi H Pham
*Assistant Examiner* — Fahmida Chowdhury
(74) *Attorney, Agent, or Firm* — Artegis Law Group, LLP

(57) ABSTRACT

One embodiment of the present disclosure sets forth a method for managing data received over a network. The method includes receiving at a first time a data packet from a node of the network, selecting a delay time associated with the node, where the delay time comprises an average delay time associated with previous communications involving the node, and processing data included in the data packet at a second time, where the second time is equal to the sum of the first time and the delay time.

20 Claims, 5 Drawing Sheets

MANAGING DATA IN A STATIC NETWORK PRIOR TO INITIALIZATION

FIELD OF THE EMBODIMENTS OF THE INVENTION

Embodiments of the present disclosure relate generally to data networks and, more specifically, to managing data in a static network prior to initialization.

DESCRIPTION OF THE RELATED ART

Data networks generally require initialization to set up control parameters and distribute timing information among the network nodes. However, many time-sensitive applications using data networks require the ability to transfer and process data before the network has been fully initialized. For example, in automotive applications, safety constraints require audio and video feeds for warning tones and backup cameras to be activated within a short time period from key-on of the vehicle. This time constraint is often too fast for the network to fully initialize.

As the foregoing illustrates, what is needed in the art is a method to manage data in a network prior to network initialization.

SUMMARY

One embodiment of the present disclosure sets forth a method for managing data received over a network. The method includes receiving at a first time a data packet from a node of the network, selecting a delay time associated with the node, where the delay time comprises an average delay time associated with previous communications involving the node, and processing data included in the data packet at a second time, where the second time is equal to the sum of the first time and the delay time.

One advantage of the disclosed embodiments is that data can be processed in the network before the network has fully initialized. An additional advantage is that errors are reduced when the network transitions from an uninitialized state to a fully initialized state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
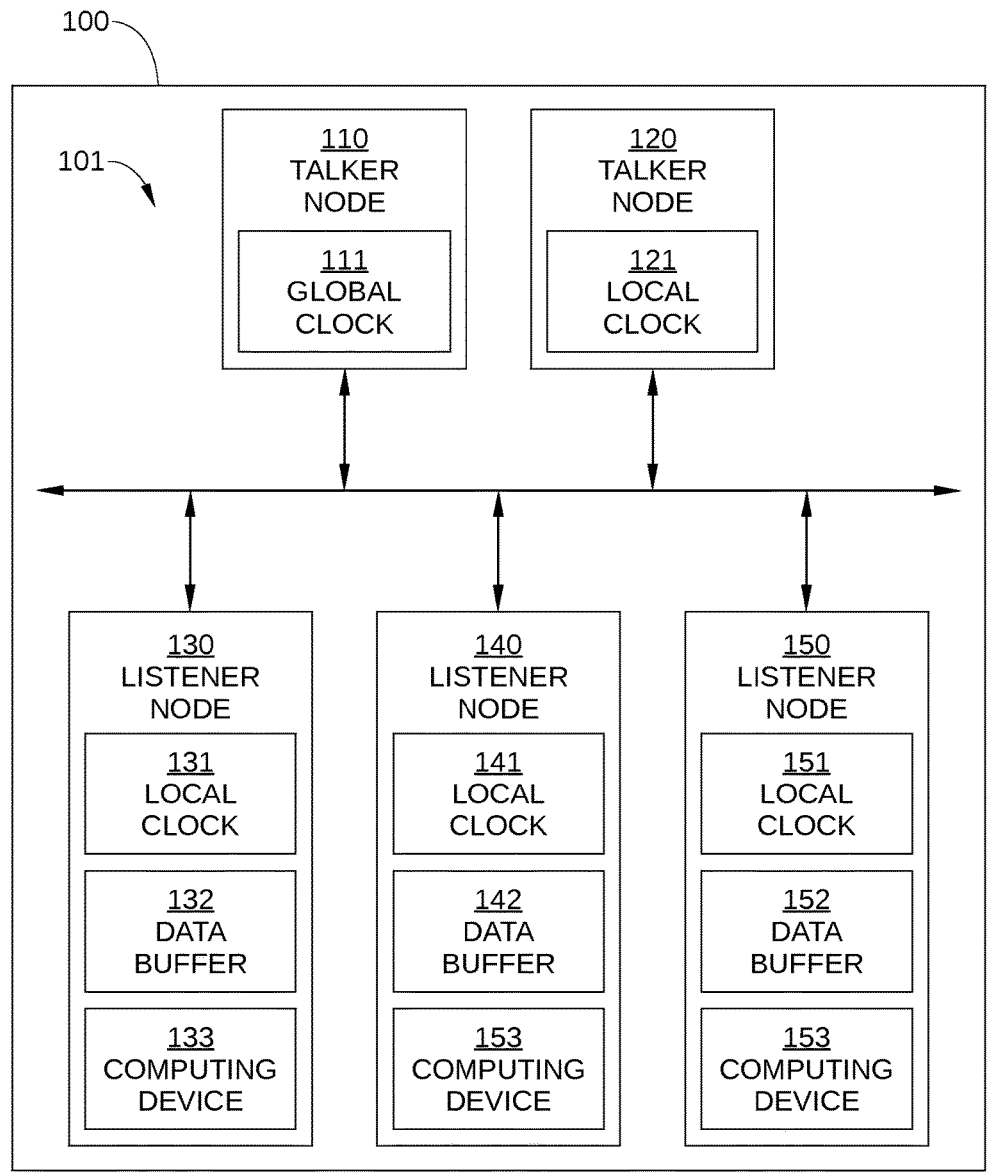
FIG. 1 is a block diagram illustrating a data network configured to implement one or more aspects.

FIG. 1 is a block diagram illustrating an operating environment 100 containing a data network 101 configured to implement one or more aspects of the present disclosure. Operating environment 100 may be an automobile or other vehicle in which data network 101 is installed. Consequently, data network 101 has a fixed topology during operation. As shown, data network 101 includes talker nodes 110 and 120 and listener nodes 130, 140, and 150, where talker nodes 110 and 120 send data and listener nodes 130, 140, and 150 receive data. Examples of talker nodes in automotive applications include radios, CD players, and cameras. Examples of listener nodes in automotive applications include video screens and amplifiers. In some embodiments, data network is configured for time-synchronized low-latency streaming of data, such as an audio-video bridging (AVB) network.

Talker node 110 is configured to transmit data to one or more of listener nodes 130, 140, and 150, and includes global clock 111. When data network 101 is fully initialized, global clock 111 provides timing information for all network nodes, i.e., talker node 120 and listener nodes 130, 140, and 150. For example, in a network using the IEEE 1722 protocol, global clock 111 may be the gPTP grandmaster. Talker node 120 is also configured to transmit data to one or more of listener nodes 130, 140, and 150, and includes local clock 121. Local clock 121 provides timing information to talker node 120, and is generally synchronized with global clock 111 when data network 101 is in an initialized state.

Listener node 130 includes a local clock 131, a data buffer 132, and a computing device 133. Similarly, listener node 140 includes a local clock 141, a data buffer 142 and a computing device 143, and listener node 150 includes a local clock 151, a data buffer 152, and a computing device 153. Local clocks 131, 141, and 151 each provide timing information to listener nodes 130, 140, and 150, respectively, and are generally synchronized with global clock 111 when data network 101 is in an initialized state. Data buffers 132, 142, and 152 each temporarily store data received by listener nodes 130, 140, and 150, respectively. Computing devices 133, 143, and 153 each include any suitable processor configured to implement one or more embodiments, such as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU.

In the embodiment illustrated in FIG. 1, listener nodes 130, 140, and 150 each include a single data buffer. In other embodiments, one or more of listener nodes 130, 140, or 150 include multiple data buffers, one for each talker node from which the listener node is configured to receive data. In such embodiments, each of the multiple data buffers may only store data received from a particular talker node of data network 101.

In operation, talker node 110 or talker node 120 may send data to listener nodes 130, 140, and/or 150 along with a timestamp indicating when the data should be processed by the receiving listener node. In some embodiments, talker node 110 generates the timestamp and sends the data and the timestamp via a data packet, such as a video packet or an audio packet. The receiving listener node (e.g., listener node 130) stores the data in an associated data buffer (e.g., data buffer 132) such that the data will be processed at the time specified by talker node 110. For example, in an embodiment in which talker node 110 is configured as a head unit of a vehicle stereo system and listener node 130 is configured as a speaker amplifier of the vehicle stereo system, talker node 110 generally transmits a stream of audio packets to listener node 130, each packet including audio data to be processed (i.e., played) by listener node 110 and a timestamp indicating when the audio data should be so processed.

It will be appreciated that the system shown herein is illustrative and that variations and modifications are possible. The network topology of data network 101, including the number of talker nodes and listener nodes may be modified as desired. It is further noted that each talker node of data network 101 may transmit data to multiple listener nodes of data network 101, and each listener node of data network 101 may receive data from multiple talker nodes. Moreover, in some embodiments, talker node 110 and/or talker node 120 may also operate as a listener node, and listener nodes 130, 140, and/or 150 may also operate as talker nodes.

Figure 2:
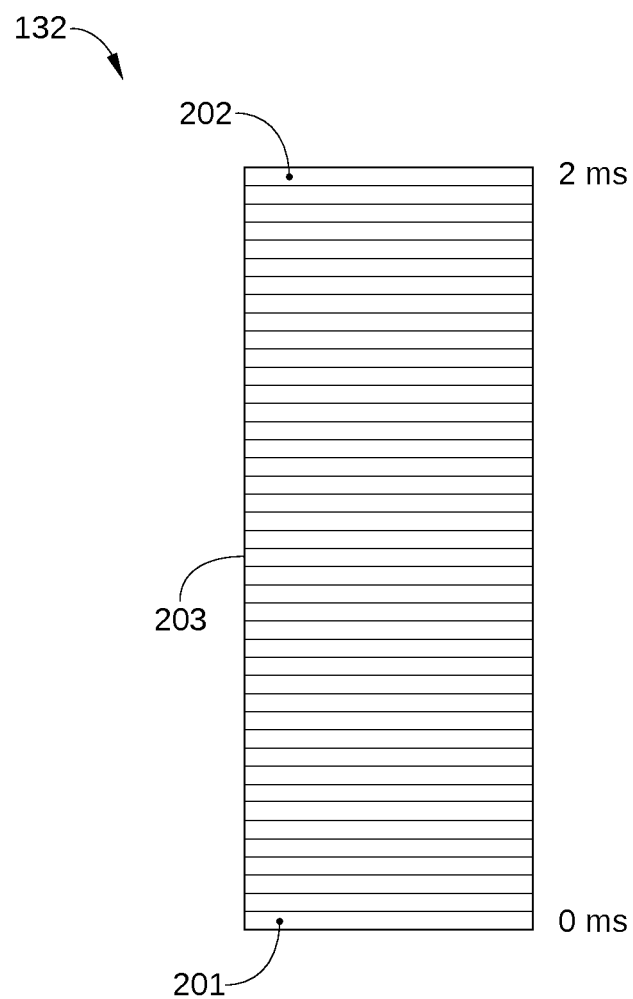
FIG. 2 is a conceptual diagram of a data buffer at a node of the network illustrated in FIG. 1 after network initialization.

FIG. 2 is a conceptual diagram of data buffer 132 at listener node 130 of data network 101 illustrated in FIG. 1 after network initialization. As shown, data buffer 132 is configured as a 2 ms first-in-first-out (FIFO) structure, however other data structures and buffer sizes may be used. Data buffer 132 includes a plurality of storage locations that are each configured to store a data entry, such as the data payload of an audio or video data packet received from a specific talker node of data network 101. Thus, data buffer 132 is configured to store a plurality of data entries, including an oldest buffer entry 201 and a newest buffer entry 202.

Oldest buffer entry 201 is the oldest buffer entry of data buffer 132, and as such, will be the next buffer entry processed by listener node 130. Newest buffer entry 202 is the newest buffer entry stored in data buffer 132, and will be processed after all other data entries currently stored in data buffer 132 are processed by listener node 130. Thus, in the embodiment illustrated in FIG. 2, in which data buffer 132 is full, data stored in newest buffer entry 202 will be processed 2 ms after being placed in data buffer 132. Typically, data buffer 132 operates with a significant portion that is not currently storing data, in which case newest buffer entry 202 is stored in a location in data buffer 132, for example in storage location 203, that corresponds to a delay time of between 0 and 2 ms. This delay time is the time difference between when newest buffer entry 203 is placed in data buffer 132 and when listener node 130 processes the data of newest buffer entry 203. In embodiments in which data buffer 132 is a FIFO structure, received data, i.e., newest buffer entry 202, are placed in the first available data entry location. In such embodiments, listener node 130 may store filler or repeated data in one or more storage locations of data buffer 132 prior to storing newest buffer entry 202, so that newest buffer entry 202 is stored in a data storage location 203 that corresponds to an appropriate delay time (i.e., the delay time indicated by a timestamp associated with newest buffer entry 202).

In operation, listener node 130 receives data from a talker node, along with a presentation timestamp indicating when listener node 130 should process the data. Listener node 130 uses this presentation timestamp to compute a suitable buffer delay and place the received data in a location in data buffer 132 such that the data will be processed at the time specified by the presentation timestamp. Because data network 101 is fully initialized, local clock 131 is synchronized with global clock 111, and a buffer delay for a particular set of received data can be accurately determined by listener node 130 from the difference between the presentation timestamp provided by the talker and local clock 131. Listener nodes 140 and 150 are substantially similar in operation to listener node 130, and data buffers 142 and 152 are substantially similar in operation to data buffer 132.

Figure 3:
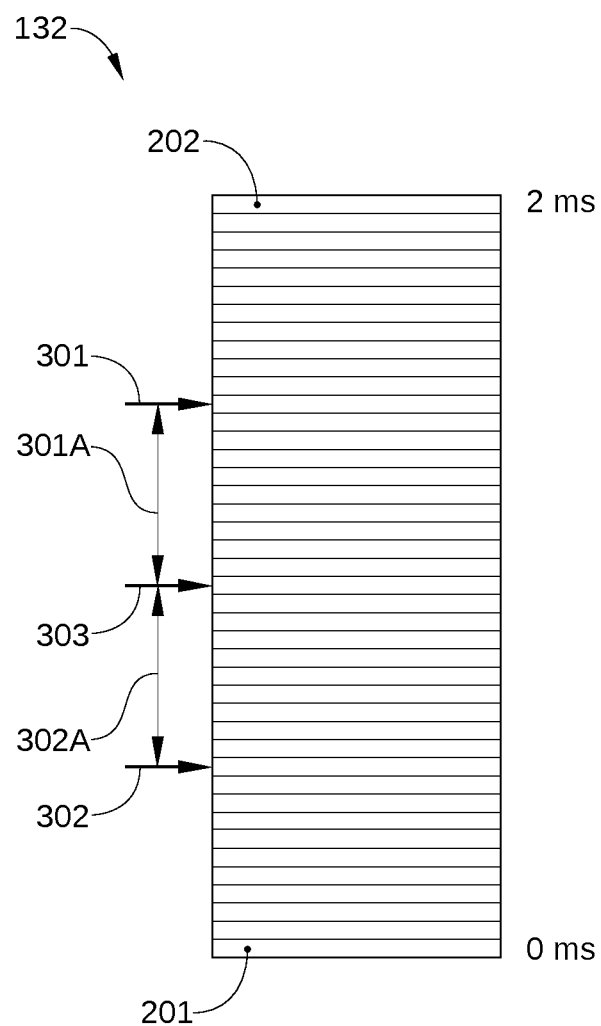
FIG. 3 is a conceptual diagram of the data buffer of FIG. 2 after network initialization, according to an embodiment.

FIG. 3 is a conceptual diagram of data buffer 132 of FIG. 2 after network initialization, according to an embodiment. It is noted that prior to network initialization, i.e., when data network 101 is in an uninitialized state, global timing information may not be available to listener node 130. Consequently, a suitable buffer delay for a received data packet cannot be accurately computed from the presentation timestamp provided by the talker node, as described above in conjunction with FIG. 2. However, as shown in FIG. 3, during an active session when data network 101 is fully initialized, a high buffer fill level threshold 301, a low buffer fill level threshold 302, and an average buffer fill level 303 may be recorded for data streams between a given talker node and listener node 130, and may then be used to determine the buffer delay for data received by listener node 130 prior to network initialization.

Average buffer fill level 303 corresponds to an average delay time associated with previous communications involving the talker node and listener node 130 that occur when data network 101 is in an initialized state. Specifically, the average delay time may be the delay time that occurs between the time a buffer entry is stored in data buffer 132 at average buffer fill level 303 and the time the buffer entry is processed by listener node 130. High buffer fill level threshold 301 is a target or typical maximum fill level of data buffer 132 that occurs when data network 101 is in an initialized state, and low buffer fill level threshold 302 is a target or typical minimum fill level of data buffer 132 that occurs when data network 101 is in an initialized state. High buffer fill level threshold 301 and low buffer fill level threshold 302 may be values based on measured performance of data buffer 132, and/or on fixed values, such as a predetermined offset 301A or 302A from average buffer fill level 303.

In some embodiments, high buffer fill level threshold 301 and low buffer fill level threshold 302 may be used to adjust the frequency of local clock 131 to properly track the frequency of the talker node clock (e.g., global clock 111) and avoid over-filling or draining data buffer 132. Specifically, when data network 101 is in an uninitialized state and the fill level of data buffer 132 exceeds high buffer fill level threshold 301, data buffer 132 may be at risk of over-filling, and listener node 130 adjusts the frequency of local clock 131 accordingly. Similarly, when data network 101 is in an uninitialized state and the fill level of data buffer 132 falls below low buffer fill level threshold 302, data buffer 132 may be at risk of draining, and listener node 130 adjusts the frequency of local clock 131 accordingly.

The static topology of data network 101 facilitates repeatable transit times between network nodes so that previously recorded threshold values, i.e., high buffer fill level threshold 301, low buffer fill level threshold 302, and average buffer fill level 303, can be used instead of global time data to enable data transfer prior to network initialization. Thus, when data network 101 is in an uninitialized state, listener node 130 can still process data received from a talker node of data network 101 at an appropriate time delay to generate, for example, audio output of sufficient quality to be audible.

Figure 4:
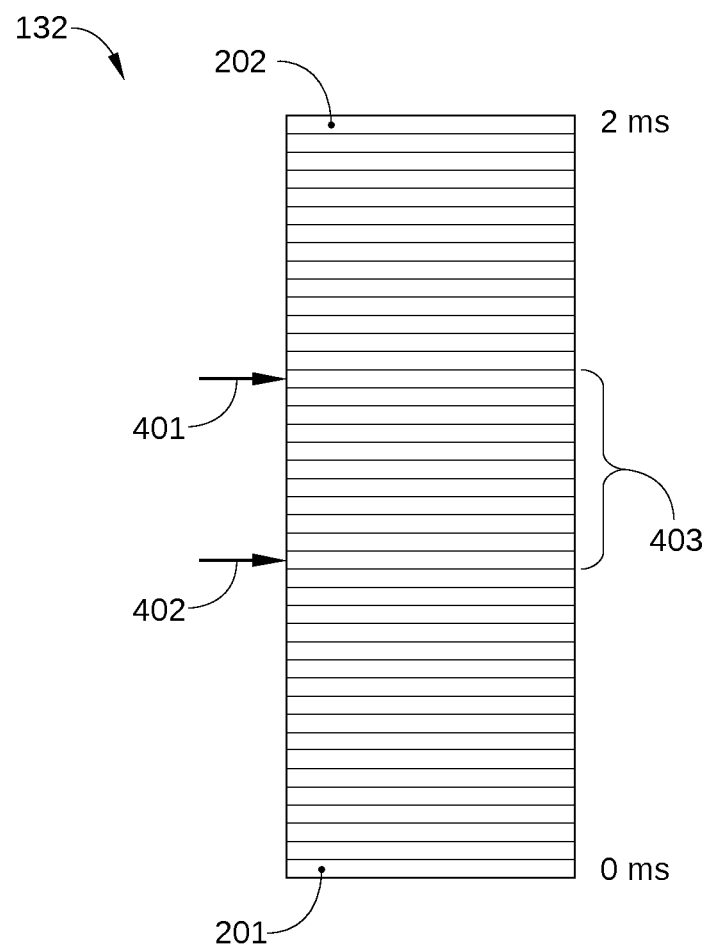
FIG. 4 is a conceptual diagram of the data buffer of FIG. 2 during network initialization, according to an embodiment.

FIG. 4 is a conceptual diagram of data buffer 132 of FIG. 2 during network initialization, according to an embodiment. In addition to data buffer 132, a current buffer insertion point 401, a presentation time 402, and an insertion error 403 are also shown. Prior to network initialization, current buffer insertion point 401 for data received from a talker node is chosen using average buffer fill level 303, previously described above in conjunction with FIG. 3. In this way, the data received from the talker node are processed by listener node 130 after a suitable time delay that approximates the delay that typically occurs at listener node 130 when data network 101 is in an initialized state.

After data network 101 is fully initialized, presentation time 402 for data received by listener node 130 from a talker node is determined using the presentation timestamp included with the received data and the synchronized local clock value of local clock 131, as previously described in FIG. 2. Thus, when data network 101 transitions from an uninitialized state to an initialized state, there will be an insertion error 403 between the current buffer insertion point 401 and the presentation time 402, since prior to network initialization global clock 111 and local clock 131 are not synchronized. However, because listener node 130 processes data with a time delay that is based on an average delay time associated with previous communications involving the talker node, insertion error 403 is relatively small. Generally, insertion error 403 is of suitably short duration to be compensated for using methods known in the art, such as dropping data samples, duplicating data samples, or adjusting the data play out rate of listener node 130.

Figure 5:
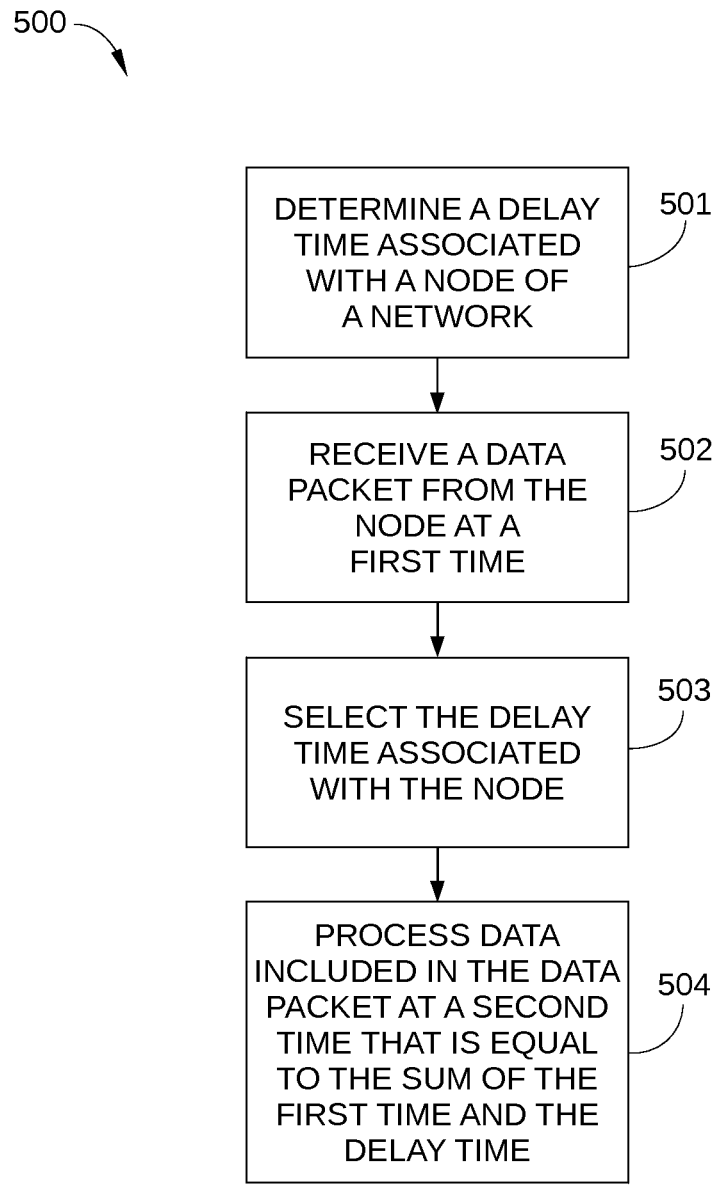
FIG. 5 sets forth a flowchart of method steps for processing data received over a network, according to an embodiment.

FIG. 5 sets forth a flowchart of method steps for processing data received over a network, according to an embodiment. Although the method steps are described with respect to the systems of FIGS. 1-4, persons skilled in the art will understand that any system configured to perform the method steps, in any order, falls within the scope of the present disclosure.

As shown, a method 500 begins at step 501, where the delay time associated with a given talker-listener node pair is determined. For example, listener node 130 may determine the delay time for data received from talker node 110 based on an average delay time associated with communications involving talker node 110. This delay time corresponds to the delay time that occurs between a buffer entry being stored at average buffer fill level 303 in data buffer 132 and the buffer entry being processed by listener node 130. Typically, step 501 is performed by listener node 130 when data network 101 is in an initialized state. In some embodiments, listener node 130 stores the delay time for subsequent use.

In step 502, listener node 130 receives a data packet from talker node 130 at a first time. Step 502 is generally performed by listener node 130 when data network 101 is in an uninitialized state.

In step 503, listener node 130 selects the delay time associated with the talker node. If data network 101 is fully initialized, this delay time is determined using the timestamp provided by the talker, as described in conjunction with FIG. 2. If data network 101 has not yet been initialized, the delay time comprises an average delay time associated with previous communications involving talker node 110 and listener node 130, as described in conjunction with FIG. 3.

In step 504, listener node 130 processes the data included in the data packet at a second time that is equal to the sum of the first time and the delay time. In some embodiments, the delay time is implemented by storing the data included in the packet in a suitable location in data buffer 132, i.e., at a location corresponding to average buffer fill level 303.

As persons skilled in the art will appreciate, the approach of method 500, as described herein, may be applied to any data network with a static topology during operation, and not simply to a network installed in an automobile or other vehicle.

In sum, embodiments of the disclosure set forth systems and methods for managing data in a static network prior to initialization. By calculating an average time delay indicated by a talker node for data received from the talker node during an initialized network state, a listener node can implement the average delay to data received from the talker node during an uninitialized state. Advantageously, the quality of low-latency data streaming in the network, when in an uninitialized state and when transitioning to an initialized state, is thereby improved.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present disclosure, other and further embodiments of the disclosure may be devised without departing from the basic scope thereof, and the scope thereof is determined by the claims that follow.

What is claims is:

1. A method of processing data received over a network, the method comprising:
   receiving, at a first node and at a first time when the network is in a first state, a data packet from a second node of the network;
   selecting, at the first node, a delay time associated with the second node, wherein the delay time comprises an average delay time associated with processing, at the first node, previous communications involving the second node over the network when the network is in a second state; and
   processing, at the first node, data included in the data packet at a second time, wherein the second time is equal to a sum of the first time and the delay time.

2. The method of claim 1, further comprising:
   prior to receiving the data packet, determining the delay time associated with the second node; and
   storing the delay time.

3. The method of claim 2, wherein the second state comprises an initialized state of the network, and wherein determining the delay time comprises calculating the average delay time associated with the previous communications involving the second node that occur when the network is in the initialized state.

4. The method of claim 1, wherein the first state comprises an uninitialized state.

5. The method of claim 1, wherein the network is configured with a fixed topology during operation.

6. The method of claim 1, wherein the network is configured for time-synchronized low-latency streaming of data.

7. The method of claim 1, wherein the previous communications involving the second node comprise an additional data packet that includes a timestamp that is generated by the second node and indicates a processing time for data included in the additional data packet.

8. The method of claim 1, further comprising:
storing data included in the data packet in a data buffer; and
modifying a frequency of a local clock that is associated with the data buffer.

9. The method of claim 8, wherein modifying the frequency of the local clock is based on a current fill level of the data buffer and one of an upper buffer fill level threshold or a lower buffer fill level threshold.

10. A computing device, comprising:
a memory; and
a processor coupled to the memory configured to:
receive, at a first node and at a first time when the network is in a first state, a data packet from a second node of the network;
select, at the first node, a delay time associated with the second node, wherein the delay time comprises an average delay time associated with processing, at the first node, previous communications involving the second node over the network when the network is in a second state; and
process, at the first node, data included in the data packet at a second time, wherein the second time is equal to a sum of the first time and the delay time.

11. The computing device of claim 10, wherein the processor is further configured to:
prior to receiving the data packet, determine the delay time associated with the second node; and
store the delay time.

12. The computing device of claim 11, wherein the second state comprises an initialized state of the network, and wherein the processor is configured to determine the delay time by calculating the average delay time associated with the previous communications involving the second node that occur when the network is in the initialized state.

13. The computing device of claim 10, wherein the first state comprises an uninitialized state.

14. The computing device of claim 10, wherein the previous communications involving the second node comprise an additional data packet that includes a timestamp that is generated by second the node and indicates a processing time for data included in the additional data packet.

15. The computing device of claim 10, wherein the processor is further configured to:
store data included in the data packet in a data buffer; and
modify a frequency of a local clock that is associated with the data buffer.

16. A non-transitory computer readable medium storing instructions that, when executed by a processor, cause the processor to process data received over a network by performing the steps of:
receiving, at a first node and at a first time when the network is in a first state, a data packet from a second node of the network;
selecting, at the first node, a delay time associated with the second node, wherein the delay time comprises an average delay time associated with processing, at the first node, previous communications involving the second node over the network when the network is in a second state; and
processing, at the first node, data included in the data packet at a second time, wherein the second time is equal to a sum of the first time and the delay time.

17. The non-transitory computer readable medium of claim 16, further storing instructions that, when executed by the processor, cause the processor to perform the steps of:
prior to receiving the data packet, determining the delay time associated with the second node; and
storing the delay time.

18. The non-transitory computer readable medium of claim 17, wherein the second state comprises an initialized state of the network, and wherein determining the delay time comprises calculating the average delay time associated with the previous communications involving the second node that occur when the network is in the initialized state.

19. The non-transitory computer readable medium of claim 16, wherein the first state comprises an uninitialized state.

20. The non-transitory computer readable medium of claim 16, further storing instructions that, when executed by the processor, cause the processor to perform the steps of:
storing data included in the data packet in a data buffer; and
modifying a frequency of a local clock that is associated with the data buffer.

* * * * *